(12) United States Patent
Chu

(10) Patent No.: US 12,226,270 B2
(45) Date of Patent: Feb. 18, 2025

(54) THREE-POINT LOCATING DENTAL IMPLANT LOCATING GUIDE AND THREE-POINT LOCATING MODELING METHOD

(71) Applicant: Yu Hua Chu, Taipei (TW)

(72) Inventor: Yu Hua Chu, Taipei (TW)

(*) Notice: Subject to any disclaimer, the term of this patent is extended or adjusted under 35 U.S.C. 154(b) by 404 days.

(21) Appl. No.: 17/656,086

(22) Filed: Mar. 23, 2022

(65) Prior Publication Data

US 2023/0301747 A1    Sep. 28, 2023

(51) Int. Cl.
*A61C 1/08*    (2006.01)
*A61C 8/00*    (2006.01)

(52) U.S. Cl.
CPC ............ *A61C 1/084* (2013.01); *A61C 8/0089* (2013.01)

(58) Field of Classification Search
CPC ......... A61C 1/084; A61C 1/082; A61C 1/085; A61C 19/055
See application file for complete search history.

(56) References Cited

U.S. PATENT DOCUMENTS

| | | | |
|---|---|---|---|
| 5,800,168 A * | 9/1998 | Cascione | A61C 8/0089 433/75 |
| 2009/0202959 A1* | 8/2009 | Ajlouni | A61C 1/084 433/76 |
| 2012/0183922 A1* | 7/2012 | Cho | A61C 1/085 433/76 |
| 2018/0221109 A1* | 8/2018 | Chung | A61B 17/17 |

FOREIGN PATENT DOCUMENTS

| | | | |
|---|---|---|---|
| CN | 215128914 U | * 12/2021 | |
| KR | 20210001632 A | * 1/2021 | ............ A61C 1/084 |

OTHER PUBLICATIONS

KR 20210001632 A (Park Seong Joon; Chang Keun Sik) (Osstem Implant Co Ltd) Dental Drill Guiding Device, Jan. 6, 2021 [retrieved on Jun. 26, 2024]. Translation retrieved from: Espacenet (Year: 2021).*

CN215128914U (Huang Jie; Xu Wen; Sun Shaohong) Oral implant measuring and positioning instrument, Dec. 14, 2021 [retrieved on Jul. 8, 2024]. Translation retrieved from: Espacenet (Year: 2021).*

* cited by examiner

*Primary Examiner* — Cris L. Rodriguez
*Assistant Examiner* — Courtney N Huynh
(74) *Attorney, Agent, or Firm* — Rosenberg, Klein & Lee

(57) ABSTRACT

A three-point locating dental implant locating guide and a three-point locating modeling method are disclosed. The three-point locating dental implant locating guide includes a first plate and a second plate that are pivotally connected. A first locating hole is defined in the first plate. A second locating hole is defined in the second plate. A third locating hole is defined in the junction of the first plate and the second plate. Extending directions of the first locating hole, the second locating hole and the third locating hole are arranged parallel to each other. Through the first locating hole, the second locating hole and the third locating hole, a positioning locating can be guided and implanted respectively, thereby forming a three-point locating as the modeling base for producing a dental mold accurately.

7 Claims, 9 Drawing Sheets

(a) obtaining oral image data of a patient, determining a first locating point position, a second locating point position and a third locating point position in the patient's oral cavity according to the oral image data; — 510

(b) aligning the third locating hole of the dental implant locating guide with the first locating point position in the patient's oral cavity, after drilling the patient's alveolar bone in the first locating point position via the third locating hole, implanting a first locating pin in the first locating point position of the patient's alveolar bone; — 512

(c) sliding the first slide member and the second slide member and adjusting the pivot angle between the first plate and the second plate for the first locating hole and the second locating hole to be aligned with the second locating point position and the third locating point position in the patient's oral cavity respectively, after drilling the patient's alveolar bone in the second locating point position via the first locating hole as well as in the third locating point position via the second locating hole, implanting a second locating pin and a third locating pin in the second locating point position and the third locating point position of the patient's alveolar bone so that the first locating pin, the second locating pin and the third locating pin constitute a three-point locating base; — 514

(d) producing a dental mold by using the three-point locating base constituted by the first locating pin, the second locating pin and the third locating pin as a modeling base. — 516

FIG. 5

THREE-POINT LOCATING DENTAL IMPLANT LOCATING GUIDE AND THREE-POINT LOCATING MODELING METHOD

FIELD OF THE INVENTION

The present invention relates to a dental surgery guide, and more particularly to a three-point locating dental implant locating guide and a three-point locating modeling method that can be flexibly adjusted to meet different clinical needs.

BACKGROUND OF THE INVENTION

The traditional method of dental implantation mainly relies on the experience of the dentist to determine the position, depth and strength of a drill hole. However, even if the dentist has a lot of experience, it is difficult to make a 100% accurate determination for performing the work such as gum measurement, bone locating, and parallelism calibration. Thus, there are certain risks.

Therefore, dental implant planning is performed based on preoperative X-rays or computed tomography (CT) scans during implant surgery. The shape of the dentition in the edentulous area is obtained after the patient's occlusion through a mold. After the dental model (modeling) is made from a plaster mold, the exclusive surgical guide device and dentures are produced accordingly. With the manufactured surgical guide device, it is expected to ensure the accuracy of subsequent dental implant surgery. However, the method of using the plaster mold to make the dental mold is quite complicated and prone to errors. Thus, it is difficult to accurately mark the actual surgical position for the surgical guide device made from this dental mold. The dentures made based on this dental mold need to be modified continuously by the dentist in the actual dental implant process, so as to meet the actual needs. It is cumbersome and time-consuming to make the dentures. Excessive processing and modification will lead to a significant reduction in the strength of the denture. Especially, for a patient with too many missing teeth or being complete edentulous, when modeling, the dental mold is only based on his/her gums. However, since the gums are soft tissues and cannot provide a stable base for locating, the error between the manufactured dental mold and the actual state of the patient's oral cavity will be greater. As a result, the manufactured surgical guide device cannot match the actual gums of the patient's oral cavity precisely. Once the number of dental implants is large and more guide holes need to be drilled in the surgical guide device, the accumulation of errors will lead to deviation and dislocation of the drill holes, resulting in unnecessary medical disputes.

SUMMARY OF THE INVENTION

The primary object of the present invention is to provide a three-point locating dental implant locating guide and a three-point locating modeling method, which can be flexibly adjusted to meet different clinical needs and can further ensure the accuracy of a dental model.

In order to achieve the object, the present invention provides a three-point locating dental implant locating guide, comprising a first plate and a second plate.

The first plate has a first plate body. The first plate body has a first groove extending along the first plate body. A first slide member is slidably connected to the first plate body. The first slide member has a first through hole corresponding in position to the first groove. The first through hole and the first groove mutually constitute a first locating hole. One end of the first plate body is defined as a first end portion. The first end portion has a first perforation.

The second plate has a second plate body. The second plate body has a second groove extending along the second plate body. A second slide member is slidably connected to the second plate body. The second slide member has a second through hole corresponding in position to the second groove. The second through hole and the second groove mutually constitute a second locating hole. One end of the second plate body is defined as a second end portion. The second end portion has a second perforation. The first end portion of the first plate is pivotally connected to the second end portion of the second plate so that the first through hole and the second through hole are overlapped to constitute a third locating hole. Extending directions of the first locating hole, the second locating hole and the third locating hole are arranged parallel to each other.

Furthermore, the present invention provides a three-point locating modeling method using the aforementioned three-point locating dental implant locating guide.

BRIEF DESCRIPTION OF THE DRAWINGS

FIG. 5 is a flowchart of the three-point locating modeling method of the present invention.

DETAILED DESCRIPTION OF THE PREFERRED EMBODIMENTS

Embodiments of the present invention will now be described, by way of example only, with reference to the accompanying drawings.

Figure 1:
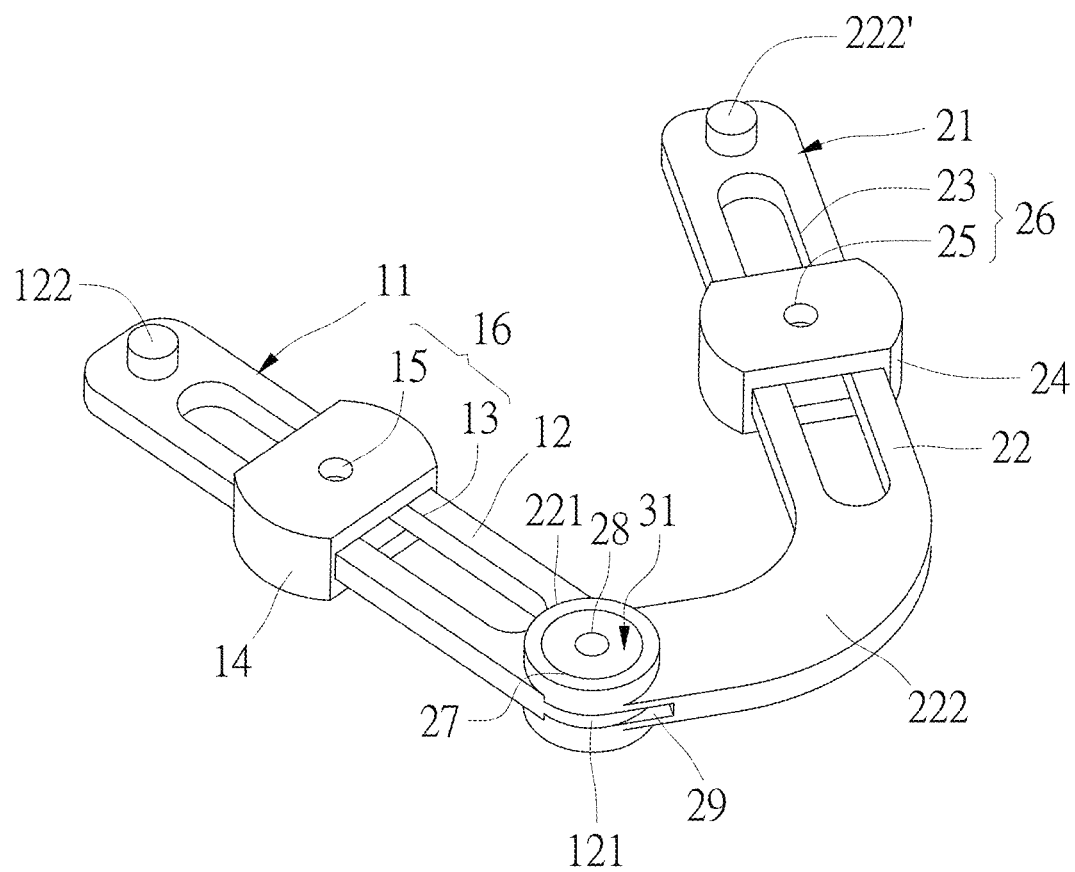
FIG. 1 is a perspective view of the present invention.
Figure 2:
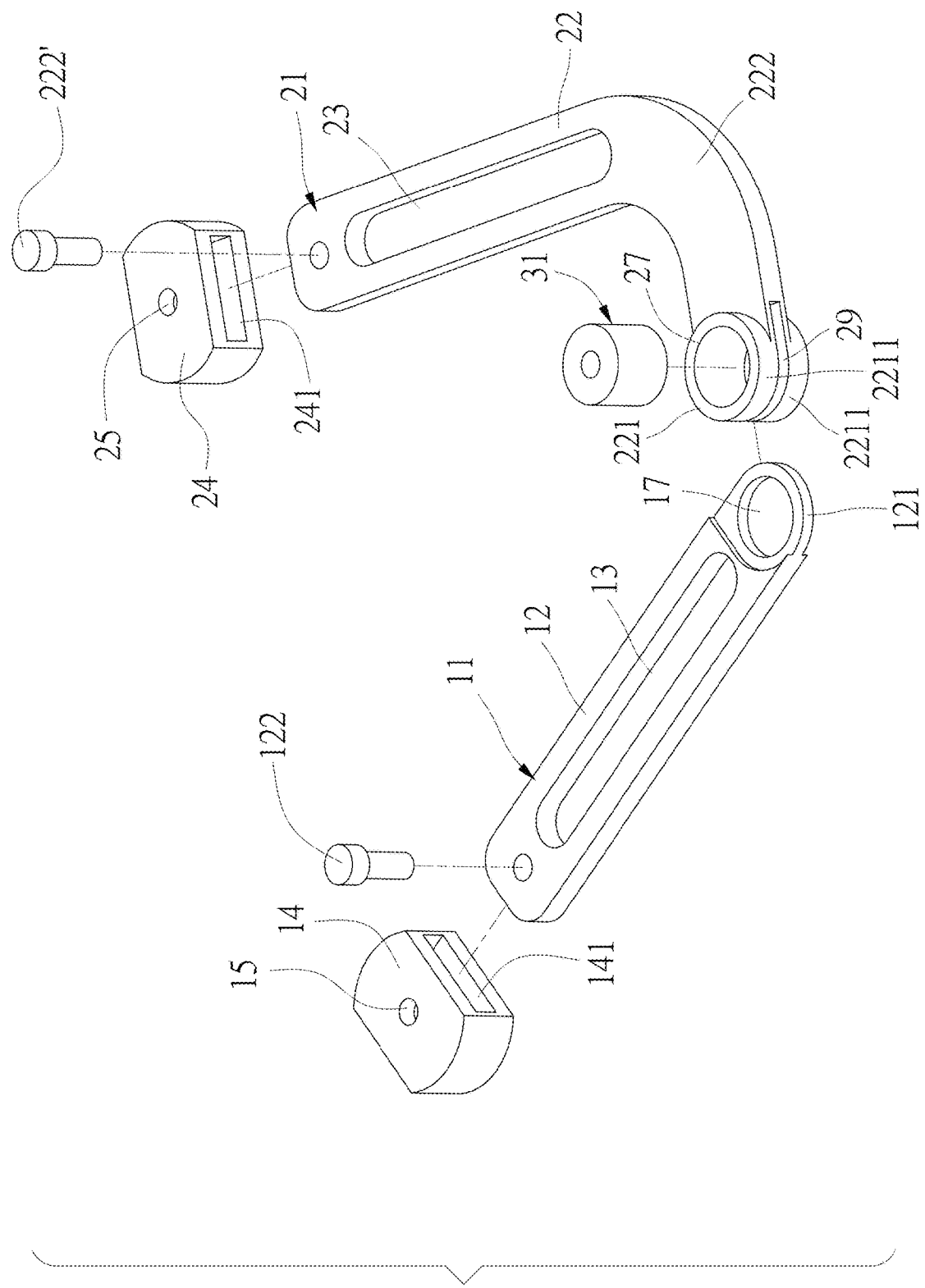
FIG. 2 is an exploded view of the present invention.

FIGS. 1-2 illustrate a three-point locating dental implant locating guide provided by the present invention, which is composed of a first plate 11 and a second plate 21 that are pivotally connected.

The first plate 11 has a first plate body 12. The first plate body 12 has a first groove 13 extending along the longitudinal axis of the first plate body 12. A first slide member 14 is slidably connected to the first plate body 12. The first slide member 14 has a first through hole 15 corresponding in position to the first groove 13. The first through hole 15 and the first groove 13 mutually constitute a first locating hole 16. One end of the first plate body 12 is defined as a first end portion 121. The first end portion 121 has a first perforation 17. In this embodiment, the first slide member 14 has a first opening 141 extending in a direction perpendicular to the first through hole 15, so that the first slide member 14 can be sleeved on the first plate body 12 through the first opening 141. A first pin 122 is insertedly connected to the other end (i.e., the end opposite to the first end portion 121) of the first plate body 12, so as to prevent the first slide member 14 from disengaging from the first plate body 12.

The second plate 21 has a second plate body 22. The second plate body 22 has a second groove 23 extending along the longitudinal axis of the second plate body 22. A second slide member 24 is slidably connected to the second plate body 22. The second slide member 24 has a second through hole 25 corresponding in position to the second groove 23. The second through hole 25 and the second groove 23 mutually constitute a second locating hole 26. One end of the second plate body 22 is defined as a second end portion 221. The second end portion 221 has a second perforation 27. The first end portion 121 of the first plate 11 is pivotally connected to the second end portion 221 of the second plate 21 so that the first perforation 17 and the second perforation 27 are overlapped. In this embodiment, the second slide member 24 has a second opening 241 extending in a direction perpendicular to the second through hole 25, so that the second slide member 24 can be sleeved on the second plate body 22 through the second opening 241. A second pin 222' is insertedly connected to the other end (i.e., the end opposite to the second end portion 221) of the second plate body 22, so as to prevent the second slide member 24 from disengaging from the second plate body 22. Furthermore, a curved section 222 is defined between the second plate body 22 and the second end portion 221. The middle portion of the second end portion 221 of the second plate body 22 is formed with a lateral slot 29. The slot 29 extends in a direction perpendicular to the second perforation 27, so that the second end portion 221 is formed with two spaced side walls 2211 that are arranged in parallel and have the second perforation 27. The first end portion 121 of the first plate 11 is inserted into the slot 29 between the two side walls 2211, so that the first perforation 17 and the second perforation 27 are overlapped. A hollow annular pivot member 31 is axially inserted in the first perforation 17 and the second perforation 27, such that the first plate 11 and the second plate 21 are pivotally connected, and the pivot member 31 encloses a third locating hole 28 in the first perforation 17 and the second perforation 27. Through the design of the curved section 222, the first end portion 121 of the first plate 11 is pivotally connected to the second end portion 221 of the second plate 21 to form a "U" shape, like the curve of the oral gum, so that the first end portion 121 of the first plate 11 and the second end portion 221 of the second plate 21 pivot in parallel relative to each other with the pivot member 31 as the axis. The extending directions of the first locating hole 16, the second locating hole 26 and the third locating hole 28 are arranged parallel to each other. Thereby, the three-point locating dental implant locating guide provided by the present invention can be achieved.

Figure 3:
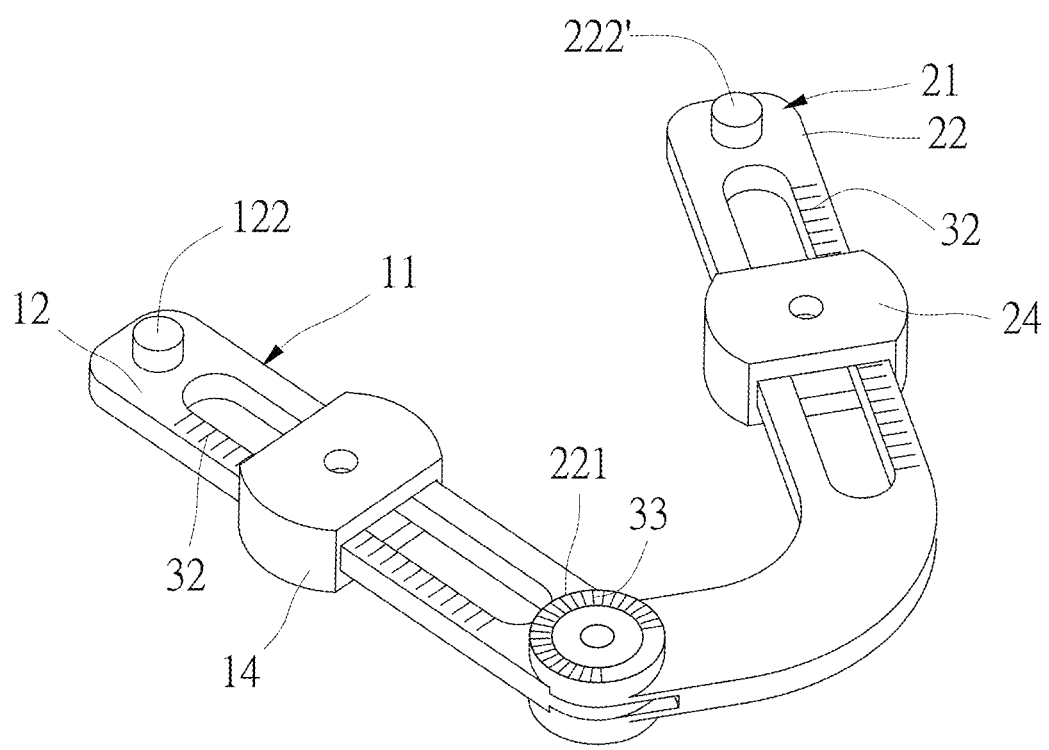
FIG. 3 is a perspective view of a preferred embodiment of the present invention.

Preferably, the first slide member 14 and the second slide member 24 can be respectively sleeved on the first plate 11 and the second plate 21 in a close fit, or locked on the first plate 11 and the second plate 21 by bolts (not shown in the figure) to limit their slide and adjustment positions. As shown in FIG. 3, a distance scale 32 may be engraved or printed on the first plate body 12 and the second plate body 22 respectively, so that the dentist can accurately adjust and determine the positions of the first slide member 14 and the second slide member 24 after being moved. An angle scale 33 arranged around the circumference of the second perforation 27 is engraved or printed on the end face of the second end portion 221, so that the dentist can accurately adjust and determine the relative pivot angle between the first plate 11 and the second plate 21.

Figure 4:
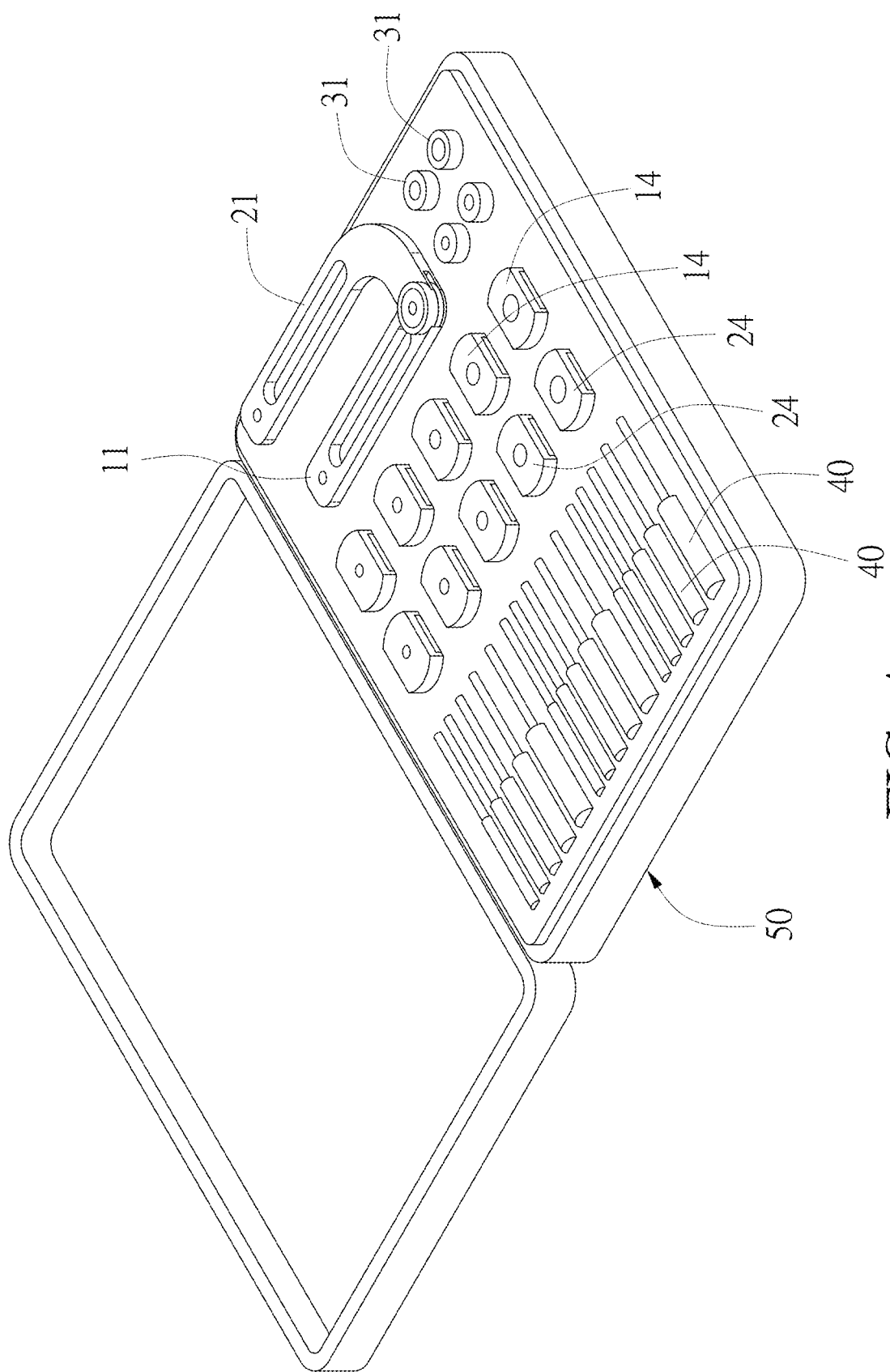
FIG. 4 is a schematic view of the present invention in a stored state.

In practical applications, as shown in FIG. 4, the first plate 11 and the second plate 21 may be stored in a storage box 50. The storage box 50 is configured to store the first slide members 14, the second slide members 24 and the pivot members 31 with different aperture specifications, and locating pins 40 with different outer diameter specifications, thereby forming a dental implant locating guide kit.

Figure 6:
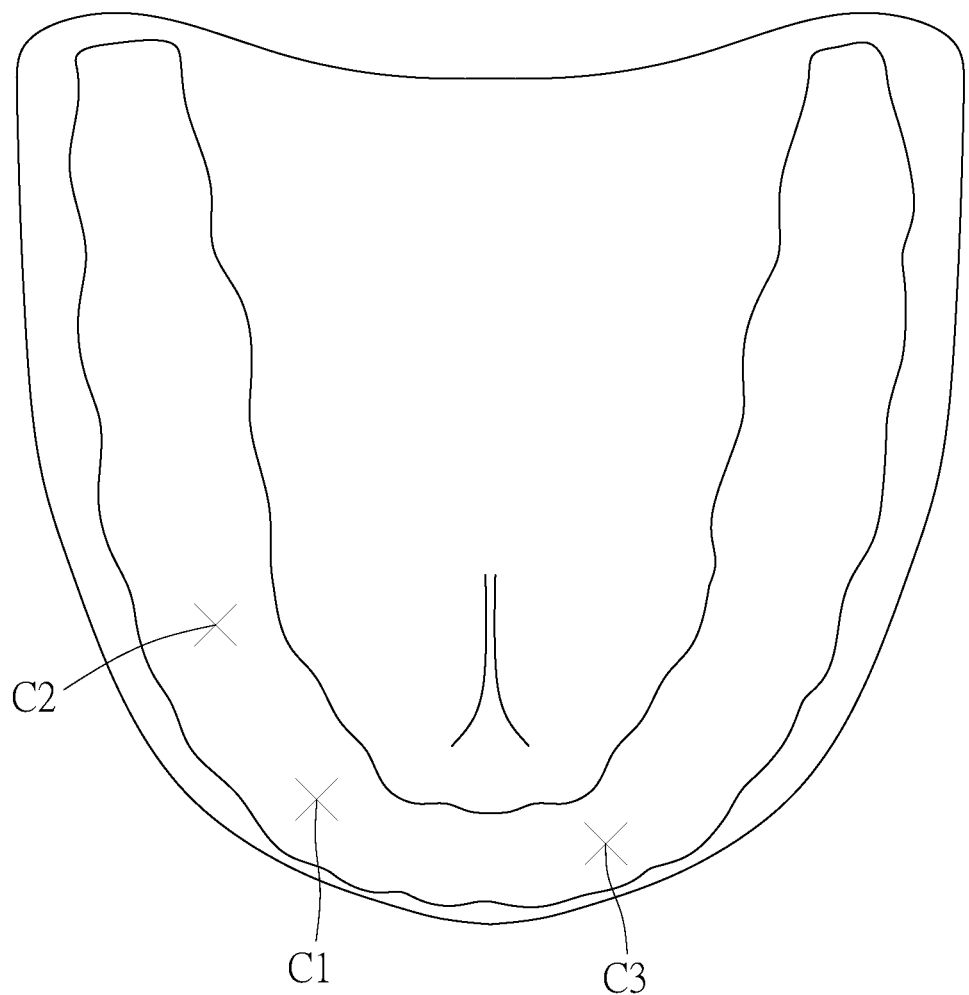
FIG. 6 is a schematic representation showing how oral image data is used in determining first, second and third locating points in an oral cavity.

In addition, referring to FIG. 5 as shown in steps 510, 512, 514, and 516, the present invention further provides a three-point locating modeling method using the aforementioned three-point locating dental implant locating guide, comprising the steps:

(a) Obtaining oral image data of a patient. The oral image data may be obtained by taking X-rays or CT (computed tomography) scans. As shown in FIG. 6 and represented by step 510 in FIG. 5, the oral image data can be used to determine a first locating point position C1, a second locating point position C2 and a third locating point position C3 in the patient's oral cavity. The oral image data includes information of the shape of the dental arch, missing teeth and alveolar bone.

Figure 7:
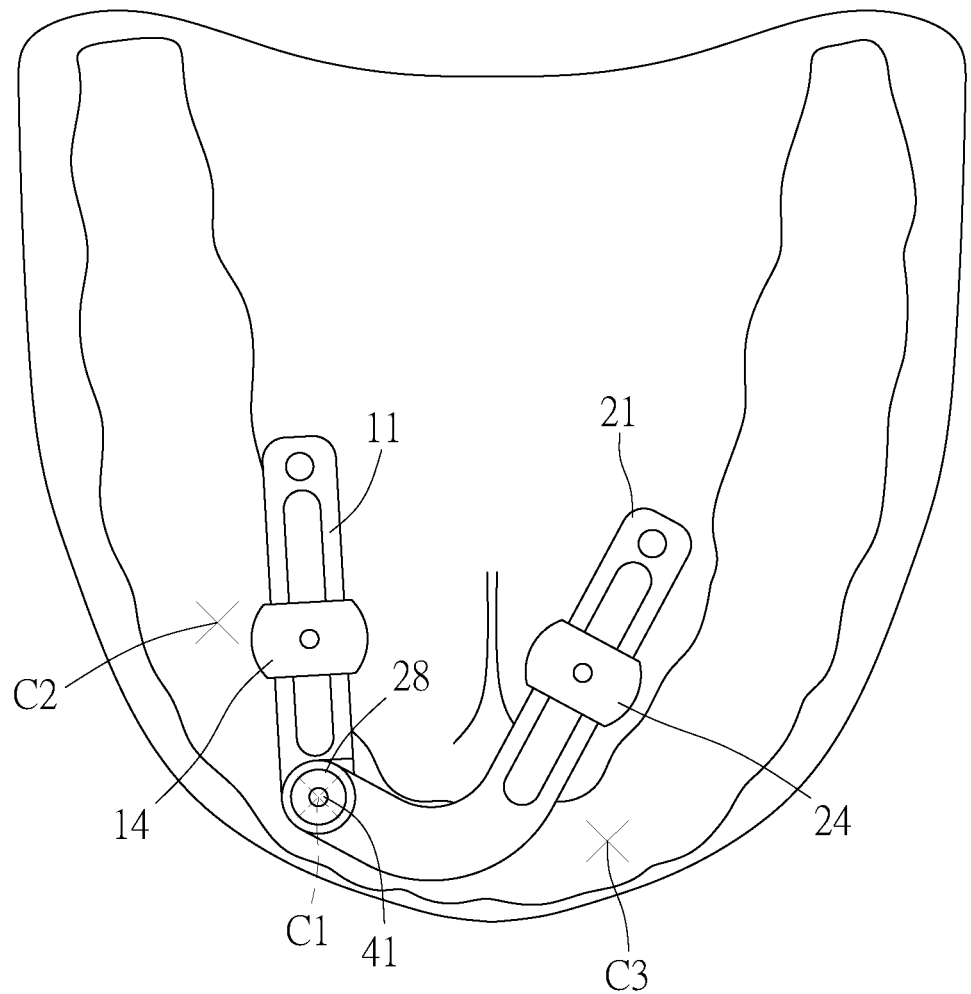
FIG. 7 is a schematic representation showing the method associated with implanting a first locating pin in the first locating point position in a patient's alveolar bone.

(b) The third locating hole 28 of the dental implant locating guide is aligned with the first locating point position C1 in the patient's oral cavity (as shown in FIG. 7 and represented by step 512 in FIG. 5). Next, after drilling the patient's alveolar bone in the first locating point position C1 via the third locating hole 28, a first locating pin 41 is implanted in the first locating point position C1 of the patient's alveolar bone.

Figure 8:
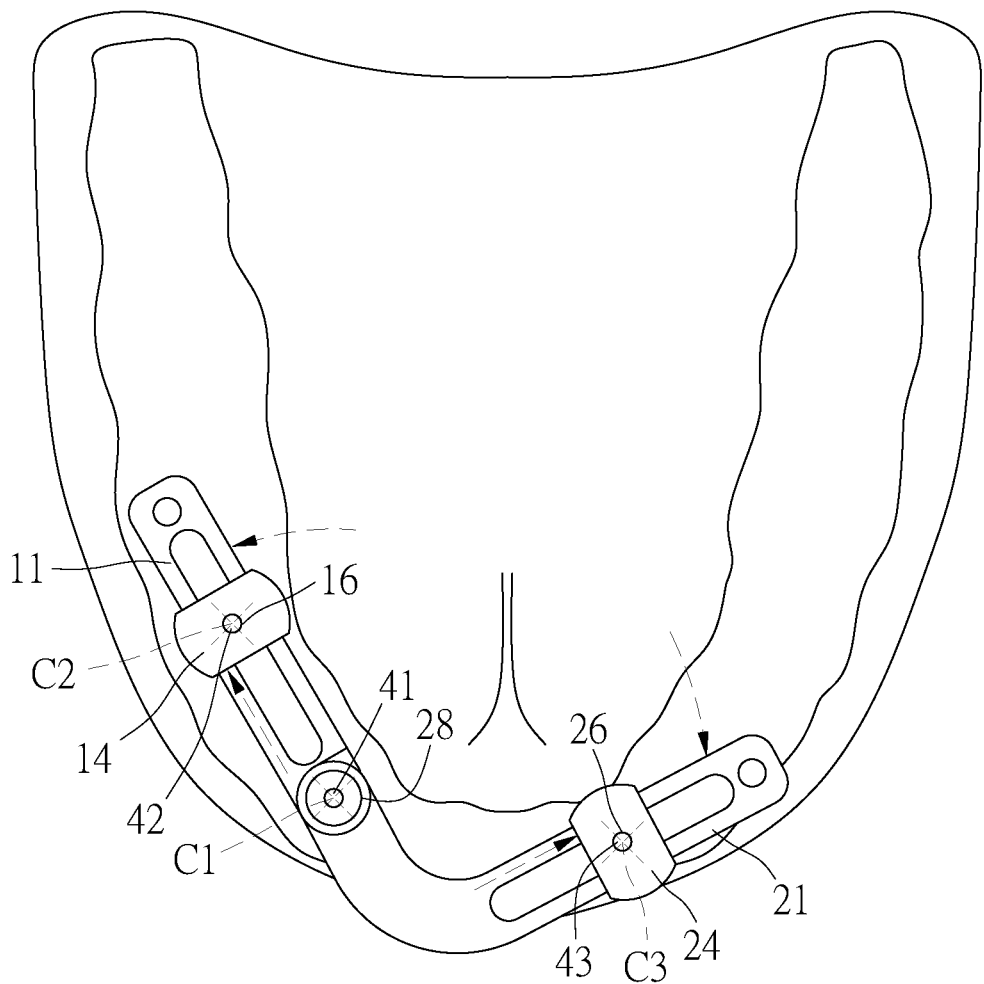
FIG. 8 is a schematic representation showing the method of positioning the first, second, and third locating pins in a proper location defining a three-point base; and, FIG. 9 is a schematic representation showing the method of producing the dental mold using the three-point base.

(c) As shown in FIG. 8 and represented by step 514 in FIG. 5, by sliding the first slide member 14 and the second slide member 24 and adjusting the pivot angle between the first plate 11 and the second plate 21, the first locating hole 16 and the second locating hole 26 are aligned with the second locating point position C2 and the third locating point position C3 in the patient's oral cavity, respectively. Next, after drilling the patient's alveolar bone in the second locating point position C2 via the first locating hole 16 as well as in the third locating point position C3 via the second locating hole 26, a second locating pin 42 and a third locating pin 43 are implanted in the second locating point position C2 and the third locating point position C3 of the patient's alveolar bone. The first locating pin 41, the second locating pin 42 and the third locating pin 43 constitute a three-point locating base. The first locating pin 41, the second locating pin 42 and the third locating pin 43 may be directly composed of an artificial implant.

Figure 9:
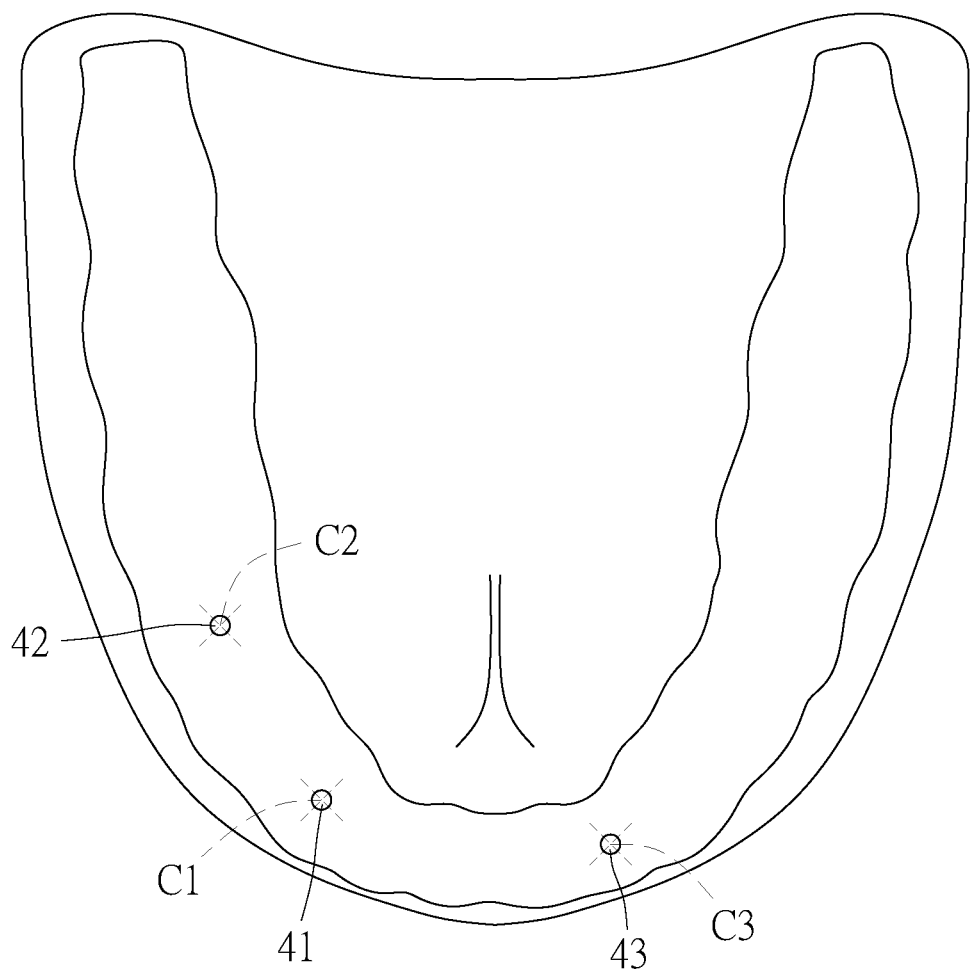

(d) Finally, as shown in FIG. 9 and represented by step 516 in FIG. 5, a dental mold (not shown in the figure) is produced by using the three-point locating base constituted by the first locating pin 41, the second locating pin 42 and the third locating pin 43 as a modeling base. After obtaining the occlusal record, the corresponding surgical guide device and its dentures can be produced accurately. Taking a patient with more missing teeth or no teeth as an example, using the locating modeling method provided by the present invention, three locating pins or artificial implants are first implanted in the oral cavity, and then the dental mold is produced based on the three-point locating base. Based on the dental mold and its occlusal record, the surgical guide device required for subsequent dental implant surgery and dentures can be directly and accurately produced, so as to ensure their accuracy.

The three-point locating dental implant locating guide and its locating modeling method provided by the present invention have the following advantages:

1. In the three-point locating dental implant locating guide provided by the present invention, the hollow pivot member 31 is used as the reference position of the first locating point. Then, by sliding the first slide member 14 and the second slide member 24 and adjusting the pivot angle between the first plate 11 and the second plate 21, the reference position of the three-point locating can be accurately located. Because the first slide member 14 and the second slide member 24 can slide to adjust their positions, and the first plate 11 and the second plate 21 can be pivoted relative to each other, the dental implant locating guide can be flexibly adjusted to meet different clinical needs.

2. In the three-point locating dental implant locating guide provided by the present invention, the first locating hole 16, the second locating hole 26 and the third locating hole 28 are formed by overlapping, respectively. Thus, the volume of the dental implant locating guide can be reduced effectively. The dental implant locating guide can be placed in the patient's oral cavity with case, and has the advantage of convenient operation.

3. In the three-point locating dental implant locating guide provided by the present invention, the extending directions of the first locating hole 16, the second locating hole 26 and the third locating hole 28 are arranged parallel to each other, so as to ensure the parallelism of the subsequent drilling directions.

4. The three-point locating modeling method adopted in the present invention uses three-point locating dental implant locating guide to implant three locating pins or to directly implant artificial implants in the patient's alveolar bone. Therefore, an extremely stable locating base can be provided, so as to effectively reduce the error of the dental mold produced subsequently.

5. The three-point locating modeling method adopted in the present invention uses the three-point locating base as the modeling base to produce the dental mold. Based on the dental mold and its occlusal record, the surgical guide device required for subsequent dental implant surgery and dentures can be directly and accurately produced. This can reduce the time required for subsequent dental implants greatly, and can avoid unnecessary medical disputes effectively.

What is claimed is:

1. A three-point locating modeling method using a three-point locating dental implant locating guide, comprising:
    providing a first plate, having a first plate body, the first plate body having a first groove extending along the first plate body, a first slide member being slidably connected to the first plate body, the first slide member having a first through hole corresponding in position to the first groove, the first through hole and the first groove mutually constituting a first locating hole, one end of the first plate body being defined as a first end portion, the first end portion having a first perforation;
    providing a second plate, having a second plate body, the second plate body having a second groove extending along the second plate body, a second slide member being slidably connected to the second plate body, the second slide member having a second through hole corresponding in position to the second groove, the second through hole and the second groove mutually constituting a second locating hole, one end of the second plate body being defined as a second end portion, the second end portion having a second perforation, the first end portion of the first plate being pivotally connected to the second end portion of the second plate so that the first perforation and the second perforation are overlapped to constitute a third locating hole, extending directions of the first locating hole, the second locating hole and the third locating hole being arranged parallel to each other;
    obtaining oral image data of a patient;
    determining a first locating point position, a second locating point position and a third locating point position in the patient's oral cavity according to the oral image data;
    aligning the third locating hole of the dental implant locating guide with the first locating point position in the patient's oral cavity after drilling the patient's alveolar bone in the first locating point position via the third locating hole and implanting a first locating pin in the first locating point position of the patient's alveolar bone;
    sliding the first slide member and the second slide member and adjusting a pivot angle between the first plate and the second plate for the first locating hole and the second locating hole to be aligned with the second locating point position and the third locating point position in the patient's oral cavity respectively, after drilling the patient's alveolar bone in the second locating point position via the first locating hole as well as in the third locating point position via the second locating hole, and implanting a second locating pin and a third locating pin in the second locating point position and the third locating point position of the patient's alveolar bone in order that the first locating pin, the second locating pin and the third locating pin constitute a three-point locating base; and,
    producing a dental mold by using the three-point locating base constituted by the first locating pin, the second locating pin and the third locating pin as a modeling base.

2. The method as claimed in claim 1, wherein the first slide member has a first opening extending in a direction perpendicular to the first through hole, the first slide member is sleeved on the first plate body through the first opening, the second slide member has a second opening extending in a direction perpendicular to the second through hole, and the second slide member is sleeved on the second plate body through the second opening.

3. The method as claimed in claim 1, wherein the second end portion of the second plate is formed with a lateral slot, the slot extends in a direction perpendicular to the second perforation so that the second end portion is formed with two spaced side walls that are arranged in parallel each to the other, the first end portion of the first plate is inserted into the slot between the two side walls so that the first perforation and the second perforation are overlapped, a hollow annular pivot member is inserted in the first perforation and the second perforation so that the first plate and the second plate are pivotally connected, and the pivot member encloses the third locating hole in the first perforation and the perforation hole.

4. The method as claimed in claim 1, wherein a curved section is defined between the second plate body and the second end portion, so that the first end portion of the first plate is pivotally connected to the second end portion of the second plate to form a U shape.

5. The method as claimed in claim 1, wherein a distance scale is provided on the first plate body and the second plate body for determining positions of the first slide member and the second slide member after being moved.

6. The method as claimed in claim 1, wherein an angle scale arranged around a circumference of the second perforation is engraved or printed on an end face of the second end portion for determining the pivot angle between the first plate and the second plate.

7. The method as claimed in claim 1, wherein the first locating pin, the second locating pin and the third locating pin are composed of an artificial implant, respectively.

* * * * *